United States Patent
Bristow

(10) Patent No.: US 7,313,366 B1
(45) Date of Patent: Dec. 25, 2007

(54) RADIO COMMUNICATIONS UNIT

(75) Inventor: Robert Owen Bristow, Basingstoke (GB)

(73) Assignee: Telefonktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/743,668

(22) PCT Filed: Jul. 5, 1999

(86) PCT No.: PCT/EP99/04665

§ 371 (c)(1),
(2), (4) Date: May 1, 2001

(87) PCT Pub. No.: WO00/04659

PCT Pub. Date: Jan. 27, 2000

(30) Foreign Application Priority Data

Jul. 15, 1998 (GB) .................................. 9815392.7

(51) Int. Cl.
*H04B 1/00* (2006.01)
(52) U.S. Cl. ............... 455/63.1; 455/226.1; 455/226.2; 455/226.3
(58) Field of Classification Search ............... 455/63.1, 455/226.1, 226.2, 226.3, 295, 296
See application file for complete search history.

(56) References Cited

U.S. PATENT DOCUMENTS

| 5,001,776 | A | * | 3/1991 | Clark ....................... 455/226.2 |
| 5,257,397 | A | * | 10/1993 | Barzegar et al. ......... 455/553.1 |
| 5,375,123 | A |   | 12/1994 | Andersson et al. |
| 5,418,843 | A |   | 5/1995 | Stjernholm |
| 5,574,979 | A | * | 11/1996 | West .......................... 455/63.1 |
| 5,603,092 | A |   | 2/1997 | Stjernholm |
| 5,649,290 | A |   | 7/1997 | Wang |
| 5,953,661 | A | * | 9/1999 | Schwinghammer et al. 455/423 |
| 6,088,589 | A | * | 7/2000 | Valentine et al. ........... 455/433 |
| 6,181,946 | B1 | * | 1/2001 | Gettleman et al. .......... 455/509 |
| 6,233,430 | B1 | * | 5/2001 | Helferich .................... 340/7.21 |
| 6,272,359 | B1 | * | 8/2001 | Kivela et al. ............... 455/567 |
| 6,421,328 | B1 | * | 7/2002 | Larribeau et al. ........... 370/329 |
| 6,542,758 | B1 | * | 4/2003 | Chennakeshu et al. .. 455/569.2 |

FOREIGN PATENT DOCUMENTS

DE    35 28 886 A    2/1987

(Continued)

OTHER PUBLICATIONS

Tzimeas, K., International Search Report, International App. No. PCT/EP99/04665, Oct. 15, 1999, pp. 1-6.

(Continued)

*Primary Examiner*—Joseph Feild
*Assistant Examiner*—S. Smith
(74) *Attorney, Agent, or Firm*—Michael Cameron

(57) ABSTRACT

There is described a radio communications system, including a unit which is able to communicate over a radio communications network such as a satellite or cellular system, and is also able to communicate with a device such as a portable handset over a short range radio link. In order to avoid potentially troublesome interference on the communications path with the communications network, the unit is able to detect the strength of signals received on the short range radio link, and alert the user if those signals are such as to be a potential source of interference.

1 Claim, 1 Drawing Sheet

FOREIGN PATENT DOCUMENTS

| | | |
|---|---|---|
| GB | 2 288 101 A | 10/1995 |
| JP | 7030983 A | 1/1995 |
| WO | WO 92 10046 A | 6/1992 |
| WO | WO 93/08655 | 4/1993 |
| WO | WO 93/14572 | 7/1993 |
| WO | WO 95/19084 | 7/1995 |
| WO | WO 96/19873 | 6/1996 |

OTHER PUBLICATIONS

United Kingdom Search Report as Completed on Dec. 9, 1998, by Nigel Hall in connection with GB 9815392.7.

Novelty Search Report, Jan. 27, 2000.

* cited by examiner

RADIO COMMUNICATIONS UNIT

TECHNICAL FIELD

This invention relates to a radio communications unit, and more particularly to a unit which is able to communicate over a radio communications network such as a satellite or cellular system, and is also able to communicate with a device such as a portable handset over a short range radio link.

BACKGROUND OF THE INVENTION

A potential disadvantage with the use of units of the general type mentioned above is that there may be interference signals appearing on the frequency at which the unit communicates with the communication network such as the satellite or cellular network. In particular, signals received on the short range radio link may be a source of such interference.

A problem therefore arises with such units as to how to avoid interference of this type.

SUMMARY OF THE INVENTION

In accordance with the invention, interference on the communications path with the communications network is avoided by detecting the strength of signals received on the short range radio link, and alerting the user if those signals are such as to be a potential source of interference.

In particular, a unit in accordance with the invention comprises a first transceiver for communicating over a communications network such as a cellular or satellite system, and a second transceiver for communicating with a device such as a portable handset over a short range radio link. The unit further comprises means for detecting the signal strength of signals received over the short range radio link, and means for comparing that signal strength with a predetermined threshold. The unit further comprises means for alerting the user in the event that the threshold is exceeded.

This has the advantage that communications over the short range radio link can then be suspended to avoid the possibility of such interference.

DETAILED DESCRIPTION OF PREFERRED EMBODIMENT

Figure 1:
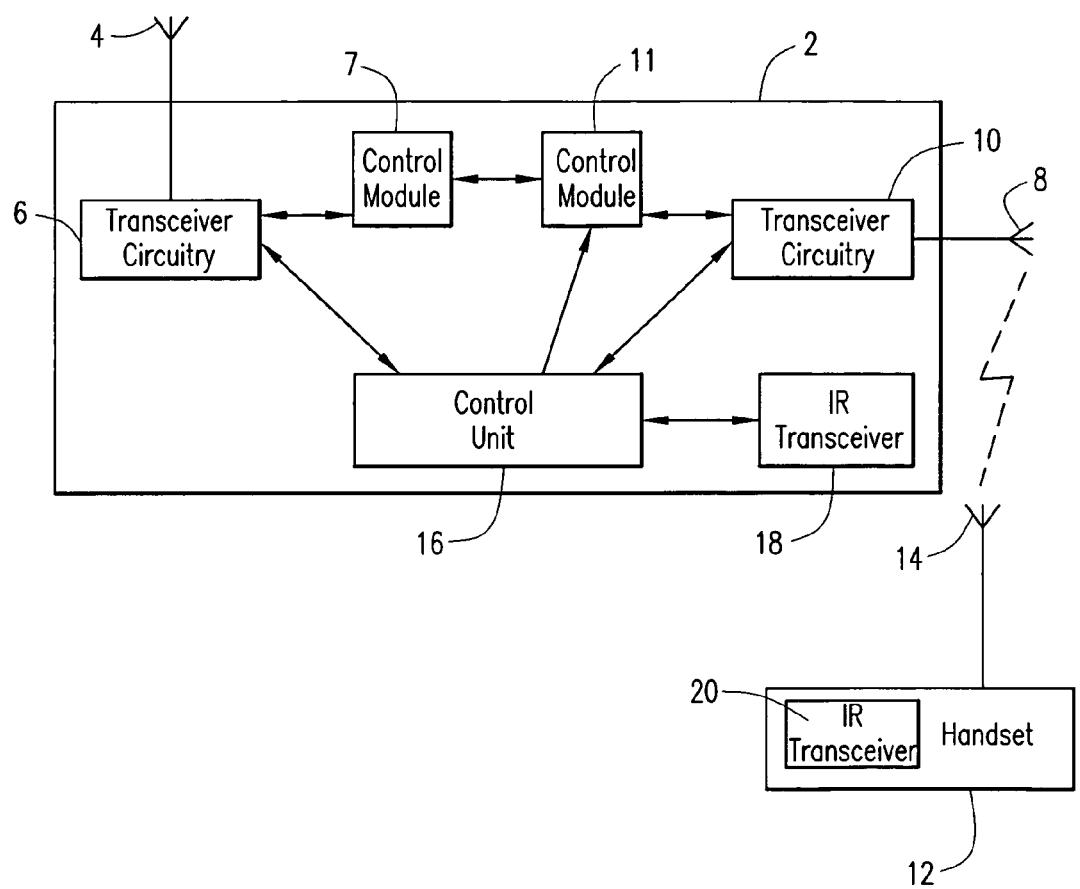
FIG. 1 is a block schematic diagram of a system in accordance with the invention.

For a better understanding of the present invention, and to show how it may be put into effect, reference will now be made, by way of example, to the accompanying drawing.

FIG. 1 shows a system in accordance with the invention.

The system 2 includes a first antenna 4, connected to transceiver circuitry 6, for communication over a radio communications network. In one preferred embodiment of the invention, the transceiver circuitry 6 is adapted for communication over a conventional cellular network, although it may equally be adapted for communication over a satellite network, or indeed any other radio communications network.

The unit 2 further comprises a second antenna 8, and transceiver circuitry 10, for communication over a short range radio link. FIG. 1 further shows a portable handset 12, having its own antenna 14, for communication over the same link with the unit 2. Although the invention is described herein with reference to communication over the short range radio link with a portable handset 12, it will be appreciated that this device may be any device which is located remotely from the system 2, or at least is moveable relative thereto.

For example, the unit 2 may be adapted for communication over a Globalstar satellite network, transmitting on channels in the band from 1610-1627 MHz, and receiving signals from the satellite on channels in the band from 2480-2500 MHz. The short range link can advantageously operate in the internationally recognised ISM band from 2400-2480 MHz, both to transmit and to receive.

The system 2 includes a satellite baseband and control module 7, and a short range link baseband and control module 11. These modules 7, 11 receive data from the respective transceiver circuits 6, 10 and transmit them to the other transceiver circuit via the other module. Moreover, the modules 7, 11 send tuning and power control signals to their respective transceiver circuit 6, 10.

The system 2 further comprises a controlling and interfacing unit 16, which controls the overall operation of the device, and, in particular, sends and receives signals to and from the transceiver units 6, 10.

The control unit 16 includes means for determining the signal strengths of signals received from the remote unit 12 at the transceiver circuitry 10. The object is to determine when the signal from the remote unit 12, received at the system main unit 2, is sufficiently strong to provide a possible source of interference for the reception of signals at the transceiver 6. This may be achieved in different ways.

As a first example, a measurement may be made of the strength of the signal received from the remote unit 12 at the short range receiver circuit 10.

As a second alternative, a measurement may be made of the signal strength of the signal from the remote unit 12 in the main receiver unit 6.

As a third alternative, a measurement may be made in the main receiver unit 6 of the strength of a noise signal at the frequency which that receiver unit is using for reception of signals from the communications network.

In FIG. 1, the control unit 16 is shown as having inputs from both transceiver circuits 6, 10. However, depending on which of these alternatives is used, only one of the inputs may be required.

In the case of this third alternative, it can be determined that any received noise signal is a result of transmissions from the remote unit 12 in different ways.

As a first example, a correlation between the occurrence of a noise signal and a known time at which the remote unit 12 is transmitting may be used as an indication that it is the remote unit 12 which is the source of the noise signal.

As a second example, a correlation between transmissions from the remote unit 12 on particular frequencies, and the occurrence of noise in the receiver unit 6, may be used as an indication that transmissions from the remote unit 12 are the source of the noise signal in the receiver unit 6.

As a third example, signals transmitted from the remote unit 12 may include a code modulated thereon in any convenient way (for example, AM, PM or FM), and the receiver unit 6 may include means for demodulation of such a code for use as an indication that it is transmissions from the remote unit 12 which are the source of noise signals received in the receiver unit 6.

In any case, the detected signal strength is compared with a predetermined threshold, set in each case at a level which is determined on the basis of a signal strength which may be a troublesome source of interference in the receiver unit 6.

If it is determined by the control unit 16, on the basis of signal strength measurements taken on signals received at the receiver unit 6 or the receiver unit 10, as described above, an alerting signal is then generated. In a preferred embodiment of the invention, this alerting signal is generated in the controlling unit 16, sent via the short range link baseband and control module 11 and the transceiver circuit 10, and transmitted across the short range radio link to the remote unit 12. In the remote unit 12, such a signal is converted into an appropriate form of warning to the user of the device. For example, the warning may take the form of an audible message, stored in the remote unit and played back in response to the receipt of an alerting signal, or a visual message, displayed on the display device of the remote unit in response to the receipt of the alerting signal, for example.

Alternatively, since any warning is likely to be issued when the remote unit 12 is close to the main unit 2, it may be acceptable, and technically simpler, for the warning to be generated in the main unit.

Alternatively or, preferably, in addition, the controlling unit can issue a command to prevent further interfering transmissions from the remote unit 12 to the receiver unit 10. For example, if the signal strength of transmissions from the remote unit 12, received at the receiver unit 10, is sufficiently high to be a potential source of interference, this is likely to be because the remote unit 12 is very close to the system main unit 2. In such an event, it is highly probable that it will be acceptable to switch to an infrared communications link between the remote unit 12 and system main unit 2. To that end, in the preferred embodiment of the invention, the system main unit 2 includes an infrared transceiver 18, and the remote unit 12 includes an infrared transceiver 20.

As an alternative, the alerting message to the user may for example request that the user discontinue the use of the radio link and instead switch to a wired communication from the remote unit to the system main unit. Again, this may be acceptable if the reason for the interference is that the remote unit has moved close to the system main unit.

As a further alternative, the main unit 2 and remote unit 12 may include alternative transceivers, allowing communications to be switched to an alternative radio frequency band, which reduces the possibility of interference.

In accordance with a preferred embodiment of the present invention, the circuitry described above may also be used to detect possible sources of interference originating other than in the radio frequency transmissions with the system main unit over the short range link. For example, transmissions over the radio communications network might suffer interference from other communications users, or even from non-communications sources of radio frequency signals such as microwave ovens.

The short range receiver unit 10 in the system main unit 2 is arranged to receive signals on channels which could potentially contain unwanted interference signals. Where the short range radio link between the system main unit 2 and the remote unit 12 is a frequency hopped system, the receiver unit 10 may hop to channels which are blocked by strong interference. In this event, the signal level is still measured, and used as a criterion to warn the user. If a strong signal occurs at a time when the error rate on the short range radio link is high, it can be inferred that the source of the signal is an unwanted third party interferer.

Alternatively, the receiver unit 6 in the system main unit 2 could be arranged to select channels which are more likely to be interfered with, and could then correlate the received noise signal with that on other channels. This would allow an inference to be made about the source of interference.

There is thus described a system which allows the possibility of interference on the main communications link to be reduced.

The invention claimed is:

1. A communications system comprising:
a communications device,
a remote unit;
the communications device comprising:
    a first transceiver for communicating over a first communication network;
    a second transceiver for communicating with the remote unit;
    means for detecting signal strengths of potentially interfering signals; means for providing an alert signal if the detected signal strengths exceed a predetermined threshold; and
    means for transmitting the alert signal to the remote unit;
the remote unit comprising:
    means for receiving an alert signal; and
    means for ceasing further radio transmissions to the communications device in response thereto; and
wherein the communications device and the remote unit each comprise an infrared transceiver, and further comprising means for switching further transmissions to the infrared transceivers in response to the alert signal.

\* \* \* \* \*

UNITED STATES PATENT AND TRADEMARK OFFICE
CERTIFICATE OF CORRECTION

PATENT NO.       : 7,313,366 B1                                             Page 1 of 1
APPLICATION NO.  : 09/743668
DATED            : December 25, 2007
INVENTOR(S)      : Bristow It is certified that error appears in the above-identified patent and that said Letters Patent is hereby corrected as shown below:

On the Title Page, item (73), under "Assignee", in Column 1, Line 1, delete "Telefonktiebolaget" and insert -- Telefonaktiebolaget --, therefor.

Signed and Sealed this

Seventh Day of October, 2008

JON W. DUDAS
*Director of the United States Patent and Trademark Office*